United States Patent
Michaelis

[19]

[11] Patent Number: 5,977,937
[45] Date of Patent: *Nov. 2, 1999

[54] DISPLAY DEVICE COMPRISING A PLURALITY OF DISPLAY UNITS AND A CONTROL CIRCUIT

[75] Inventor: Uwe Michaelis, Hamburg, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/514,525

[22] Filed: Aug. 14, 1995

[30] Foreign Application Priority Data

Aug. 13, 1994 [DE] Germany ............... 44 28 776

[51] Int. Cl.$^6$ ................................................. G09G 3/00
[52] U.S. Cl. ................................................ 345/30; 345/55
[58] Field of Search ......................... 345/33, 1, 30, 345/47, 42, 74, 75, 55, 59, 98, 99, 100, 87

[56] References Cited

U.S. PATENT DOCUMENTS

| | | |
|---|---|---|
| 4,974,248 | 11/1990 | Gils . |
| 5,021,775 | 6/1991 | Babin . |
| 5,162,789 | 11/1992 | Moriya et al. ............... 345/75 |
| 5,307,085 | 4/1994 | Nakamura ................... 345/99 |
| 5,359,343 | 10/1994 | Nakamura ................... 345/100 |

OTHER PUBLICATIONS

"Micrel Semiconductor Data Book 1991", pp. 4–61, to 4–65, 1991, MICREL Inc., SUNNYVALE US XP002029107.
Elektronik, Bd. 41, 21/1992, May 13, 1992, Munich, pp. 42–47, XP002029107.

*Primary Examiner*—Regina Liang
*Attorney, Agent, or Firm*—Dwight H. Renfrew, Jr.

[57] ABSTRACT

A display device has a plurality of display units ($D_1$, $D_2$ ... $D_n$), each display unit consisting of a number of multiplex-operated display sections, each of which has a plurality of display elements which can be simultaneously but independently switched and each of which has a respective display driver (for example, $T_1$), and a circuit arrangement for controlling the display device. The circuit arrangement includes a memory (M) in which the information to be output via the display device is stored, a microcontroller (MC) which has at least one synchronous serial interface (2) and a DMA controller (3) for transferring data intended for each time the same display section of the display units ($D_1$, $D_2$ ... $D_n$) from the memory to the interface, a shift register arrangement ($S_1$, $S_2$ ... $S_n$) which is connected to the serial interface (2) and which has a parallel output, and storage members ($L_1$, $L_2$ ... $L_n$) which are connected to the parallel output of the shift register arrangement for periodically taking up the contents of the shift register arrangement and for controlling the display drivers ($T_1$, $T_2$ ... $T_n$).

5 Claims, 1 Drawing Sheet

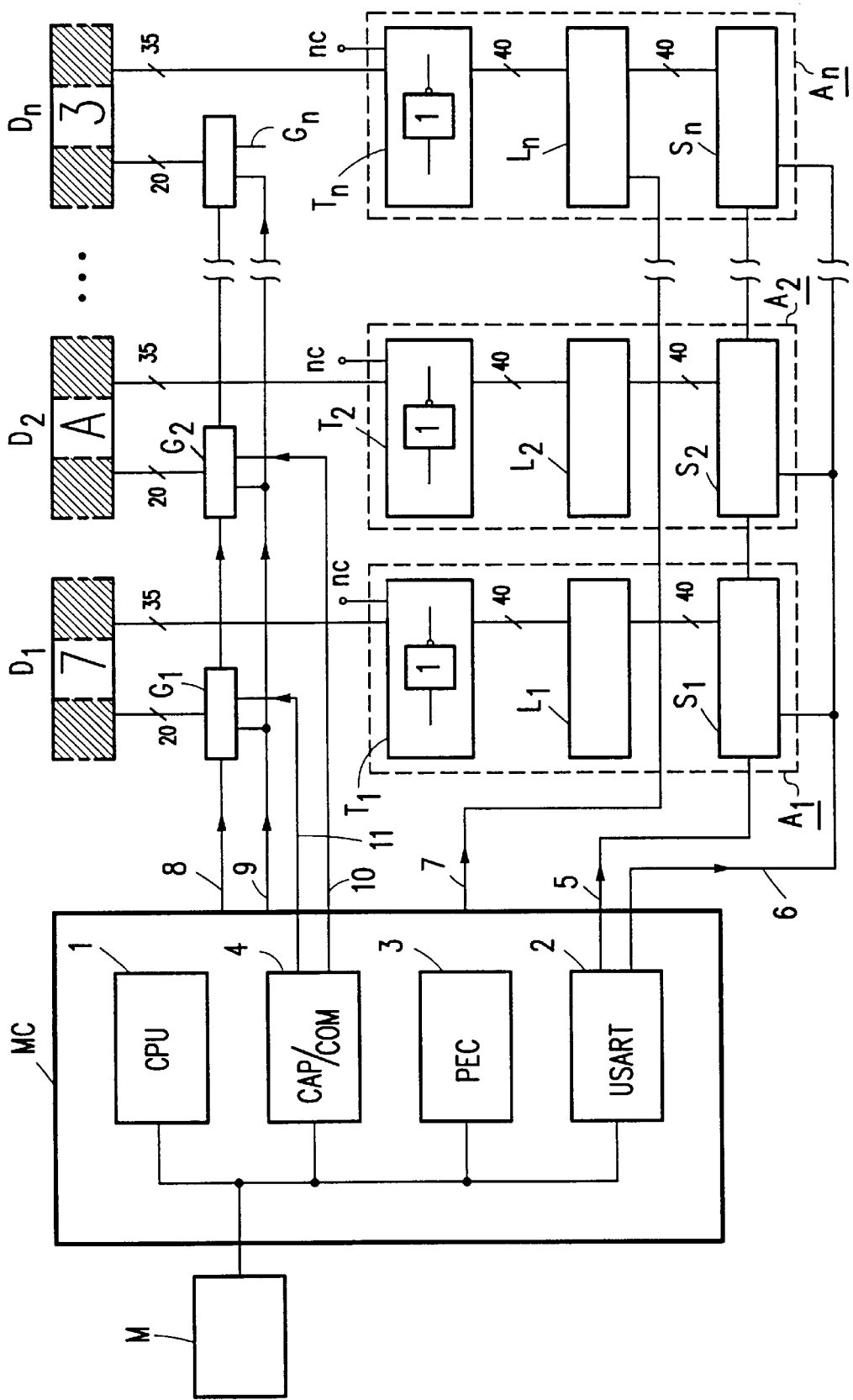

5,977,937

DISPLAY DEVICE COMPRISING A PLURALITY OF DISPLAY UNITS AND A CONTROL CIRCUIT

BACKGROUND OF THE INVENTION

1. Field of Invention

The invention relates to a display device, comprising a plurality of display units, each display unit consisting of a number of multiplex-operated display sections, each of which comprises a plurality of display elements which can be simultaneously but independently switched and each of which comprises a respective display driver, and a circuit arrangement for controlling the display device.

2. Description of the Related Art

Display devices of this kind can be used, for example in an X-ray generator for the display of an alphanumeric text of limited length. Suitable display units are notably vacuum fluorescent displays with, for example 20 display sections each. The display sections of a display unit are operated in multiplex. Each display section consists of a matrix of usually 5×7 dot-shaped display elements which are arranged in the form of a matrix.

SUMMARY OF THE INVENTION

It is an object of the present invention to provide an appropriate display device which is controlled by a microcontroller which is hardly burdened in time by the display control, so that it can also execute a number of further tasks.

On the basis of a display device of the kind set forth, this object is achieved in accordance with the invention in that there are provided:

a) a memory in which the information to be output via the display device is stored, b) a microcontroller which comprises at least one synchronous serial interface and periodically activated means for transferring the data intended for each time the same display section of the display units from the memory to the interface, c) a shift register arrangement which is connected to the serial interface and which comprises a parallel output, and d) storage members which are connected to the parallel output of the shift register arrangement for periodically taking up the contents of the shift register arrangement and for controlling the display drivers.

In accordance with the invention, all information to be output via the display device is stored in the memory, i.e. preferably in such a manner that at successive addresses in this memory the data destined for the same display section in all of the display units are stored in a given sequence. In each multiplex cycle such a data set is transferred from the memory to the synchronous, serial interface of the microcontroller, so that the data present in parallel in the memory are converted into a serial data stream. This data stream is applied to a shift register arrangement which comprises a parallel output and whose contents are periodically transferred to the storage members which control the display drivers for the display elements.

In a preferred embodiment of the invention, the means for transferring the data comprise a DMA controller. The DMA controller take over the data transfer from the microcontroller and executes it much faster than the microcontroller. Microcontrollers available with a DMA controller integrated on the same chip, are already available.

The display units in a further embodiment of the invention are vacuum fluorescent display units whose display sections are formed by a matrix-like arrangement of the matrix elements. Because vacuum fluorescent displays comprise a comparatively large number of display elements (35) per display section, the advantages of the invention are then particularly manifest.

In another embodiment of the invention there are provided means for controlling the duty cycle of the display sections. In conformity with the duty cycle, the display units are switched on for only a part of the relevant period, so that the brightness can be controlled in conformity with the duty cycle. In various microcontrollers such control of the duty cycle is possible by means of suitable timer circuits.

BRIEF DESCRIPTION OF THE DRAWING

The invention will be described in detail hereinafter on the basis of an embodiment which is shown as a block diagram in the sole FIGURE of the drawing.

DETAILED DESCRIPTION OF THE PREFERRED EMBODIMENT

The sole FIGURE of the drawing shows a display device which consists of a plurality of display units $D_1, D_2 \ldots D_n$. Vacuum fluorescent displays are used for the display units. As is known, in a vacuum fluorescent display (VFD) electrons emitted by one or more cathodes are incident, in a grid-controlled manner, on a number of point-shaped anodes when a (positive) voltage is applied thereto. The anodes are provided with a fluorescent layer which glows when electrons are incident thereon. Each VFD display unit $D_1, D_2 \ldots D_n$ comprises twenty display sections (only three of which are indicated by dashed lines in the FIGURE), always one of which is activated (indicated in the drawing by the shading of the other display sections). Each display section is defined by 5*7 anodes which are arranged in the form of a matrix and which can be independently controlled. The anodes arranged in the same locations within the individual display sections, for example at the top left, are connected to one another, so that they can be controlled by means of 35 connection leads. Each display section also comprises a control grid and always only one of these control grids carries a voltage to transmit the electrons to the anodes of the associated display section.

For each display unit $D_1, D_2 \ldots D_n$ there is provided an anode control circuit $A_1, A_2, \ldots A_n$ as well as a grid control circuit $G_1, G_2 \ldots G_n$. The anode control circuits and the grid control circuits are controlled by a microcontroller MC of the type SAB 80 C 166 (Siemens). To this end, the microcontroller MC accesses a memory M in which the information to be output via the display device $D_1, D_2 \ldots D_n$ is stored. In addition to this task, the microcontroller performs a multitude of further tasks which are not indicated in the drawing. To this end, it is important that it is not burdened too much in time by the display control. The microcontroller comprises, in addition to a central processor 1, a chip-mounted fast, serial synchronous interface 2 a DMA controller 3 and a unit 4 whose function will yet be described. The units 1 to 4 are interconnected by way of a common bus.

The serial synchronous interface 2 is capable of converting 8-bit data applied in parallel to its input into a serial data stream of up to 2.5 Mbaud. This data stream appears on the output lead 5, which thus constitutes the serial data output. Moreover, the serial interface supplies a clock signal in synchronism therewith on the output lead 6. The DMA controller 3, also referred to as a "Peripheral Event Controller"(PEC), serves to relieve the central processor 1 of the data transfer tasks. As from a given start address in the memory M, it can transport a predetermined number of 8-bit data words, for example to the serial interface 2.

Each of the anode control circuits $A_1, A_2 \ldots A_n$ comprises a respective shift register $S_1, S_2 \ldots S_n$ having a length of 40 bits. The shift registers $S_1, S_2 \ldots S_n$ are connected in series, thus forming a shift register arrangement having a length of n*40 bits. A respective intermediate memory or latch $L_1, L_2 \ldots L_n$ is connected to the parallel outputs of each of the shift registers $S_1, S_2 \ldots S_n$, said latch taking over the contents of the associated shift register in response to a latch signal on the output 7 of the microcontroller. The 40 outputs of the latches $L_1, L_2 \ldots L_n$ are connected to a respective display driver circuit $T_1, T_2 \; T_n$ which comprises 40 display drivers (the drawing symbolically shows only one display driver in the form of an inverter circuit), 35 of which are connected to the anode connection leads of the VFD display units $D_1, D_2 \ldots D_n$. The contents of the latches $L_1, L_2 \ldots L_n$ thus determine what is displayed in the respective activated display section of the associated display unit ($D_1, D_2 \ldots D_n$).

The grid control units $G_1, G_2 \ldots G_n$ determine which display unit is activated at any instant. They may be identical to the anode control circuits $A_1, A_2 \ldots A_n$; because only 20 grids need be controlled thereby, however, they need comprise only 20 control channels. Suitable control circuits are integrated circuits of the type MSC 1164 (OKI), two of these circuits then being used for anode control and one of these circuits for grid control. Each of the grid control circuits $G_1, G_2 \ldots G_n$ comprises a respective 20-bit shift register whose parallel outputs are connected to the 20 grid leads of the associated display unit $D_1, D_2 \ldots D_n$ via latches and driver circuits which are not required per se for grid control. The shift registers are connected in series, the data input of the first shift register ($G_1$) being connected to an output 8 of the microcontroller and the clock input of all shift registers being connected to an output 9 of the microcontroller. Each shift register contains only a single "1" at any instant, so that always only a single one of the 20 display sections of the associated VFD display unit $D_1, D_2 \ldots D_n$ is activated.

In order to ensure flicker-free display, the 20 display sections must be periodically switched on and off in succession at such a speed that an observer does not notice the changing over of the display sections. A customary value for the display recurrent frequency is 100 Hz, i.e. the display is repeated every 10 ms. In the case of 20 display sections, a display period T=0.5 ms then remains per display section. The function of the circuit for one display period T will be described hereinafter. At the beginning of the period, an interrupt signal is generated by an internal timer of the microcontroller MC. The central processor 1 then executes the following instructions:

A) Generating a latch signal on the output lead 7. The instantaneous contents of the shift registers $S_1, S_2 \ldots S_n$ are thus transferred to the latches $L_1, L_2 \ldots L_n$.

B) Generating a clock pulse for the shift registers of the grid control circuits $G_1, G_2 \ldots G_n$ on the output lead 9, so that the display changes over to the next display section.

C) If previously the last display section of the display units $D_1, D_2 \ldots D_n$ was activated so that subsequently the first display section must be activated again, as is the case after every 20 periods T, generating a "1" on the data output 8 and writing it in the first location of the shift register $G_1$. This is necessary because in this case a "1" proceeds from the last position of each shift register to the first position of the subsequent shift register and otherwise a "1" would no longer be present in the first shift register $G_1$ (and hence no display section would be activated).

D) Supplying, by the central processor 1, the DMA controller 3 with the start address at which in the memory M the first byte of the information to be displayed is stored for the display section to be activated in the next period T, and with the destination address whereto the byte stored at the start address is to be transported. This is the address of the serial interface 2. Finally, the central processor 1 also supplies the DMA controller 3 with the number of bytes to be transported from the memory M to the serial interface 2 within the period T, which bytes are stored in the memory M with an address sequence ascending or descending from the start address.

The control tasks of the central processor 1 have thus been completed in as far as they concern display control, and the DMA controller 3 is activated and transports the data to be displayed in the next display period T byte-by-byte from the memory M to the serial interface 2. A condition in this respect consists in that these n*5 bytes (5 bytes are required for each of the n display units) are stored at successive addresses in the memory M, starting with the predetermined start address, the data destined for the last display unit $D_n$ having to be called first whereas those destined for the first display unit $D_1$ have to be called last.

The serial interface 2 then converts the data applied thereto in parallel into a serial data stream on the data lead 5, which stream is transferred to the shift registers by way of synchronous clock pulses on the clock lead 6. Before the display period T elapses, all bytes to be transported must have been serially converted and stored in the shift register arrangement $S_1, S_2 \ldots S_n$, so that they can be transferred to the latches $L_1, L_2 \ldots L_n$ during the next display period. The number of display units which can thus be controlled via a synchronous serial interface is dependent on the number of bytes which can be converted into a serial data stream by the serial interface within the display period T of 0.5 ms. For the indicated microcontroller this amounts to approximately 100 bytes, so that 20 display units (n =20) could be controlled in this manner.

When the data to be displayed are not applied to the VFD display units $D_1, D_2 \ldots D_n$ during the entire display period T, but only during a fraction thereof, the impression of reduced brightness is created for the observer. This is utilized for the individual control of the brightness of the display units $D_1, D_2 \ldots D_n$ by means of the unit 4 in the microcontroller. This unit comprises a plurality of timers which are independent of one another and which generate a blocking pulse, within a display period, on their output leads, only two of which are shown in the drawing, i.e. the output leads 10 and 11. These output leads are connected to a control input of the display units $D_1, D_2 \ldots D_n$ which blocks the drivers associated with this circuit in response to a blocking pulse, so that subsequently all grids are blocked and display is continued not before the next display period and at the next display section.

The central processor 1 executes only a few instructions for the control of the display within a display period. Moreover, it is blocked during the 5*n instruction cycles (having a duration of 100 ns each) during which the DMA controller transports the display data from the memory M to the serial interface 2 (but not during the period during which the serial interface converts these parallel data into serial data). Thus, the central processor 1 is blocked, or involved with the control of the display, for no more than 20% of each display period. During the remainder of the display period, therefore, it can execute a number of further control tasks.

The display device in accordance with the invention is particularly suitable for the display of alphanumeric data in an X-ray generator.

I claim:

1. A circuit arrangement for controlling a display device comprising a plurality of display units, each display unit consisting of a number of multiplex-operated display sections, each of which comprises a plurality of display elements which can be simultaneously but independently switched and each of which comprises a respective display driver, characterized in that there are provided:

a) a memory in which the information to be output via the display device is stored;
   b) a microcontroller, which comprises:
      a central processor,
      at least one synchronous serial interface, and
      a DMA controller that is periodically activated by the central processor for transferring data intended for each time the same display section of the display units from the memory to the synchronous serial interface without involvement of the central processor in the transferring of the data;
   c) a shift register arrangement which is connected to the serial interface and which comprises a parallel output; and
   d) storage members which are connected to the parallel output of the shift register arrangement for periodically taking up the contents of the shift register arrangement and for controlling the display drivers.

2. A display device comprising a plurality of display units, each display unit consisting of a number of multiplex-operated display sections, each of which comprises a plurality of display elements which can be simultaneously but independently switched and each of which comprises a respective display driver, and a circuit arrangement for controlling the display device, characterized in that there are provided:

a) a memory in which the information to be output via the display device is stored;
   b) a microcontroller, which comprises:
      a central processor,
      at least one synchronous serial interface, and
      a DMA controller that is periodically activated by the central processor for transferring data intended for each time the same display section of the display units from the memory to the synchronous serial interface without involvement of the central processor in the transferring of the data;
   c) a shift register arrangement which is connected to the serial interface and which comprises a parallel output; and
   d) storage members which are connected to the parallel output of the shift register arrangement for periodically taking up the contents of the shift register arrangement and for controlling the display drivers.

3. A display device as claimed in claim 1, characterized in that the display units are vacuum fluorescent display units whose display sections are formed by a matrix-like arrangement of the matrix elements.

4. A display device as claimed in claim 1, characterized in that it comprises means for controlling the duty cycle of the display sections.

5. An x-ray generator including a device as claimed in claim 1 for the display of data.

* * * * *